(12) United States Patent
Paulrajan et al.

(10) Patent No.: US 9,408,048 B1
(45) Date of Patent: Aug. 2, 2016

(54) NOTIFICATIONS FOR CONNECTED WEARABLE DEVICES

(71) Applicant: Verizon Patent and Licensing Inc., Basking Ridge, NJ (US)

(72) Inventors: Vijayanand K. Paulrajan, Bridgewater, NJ (US); Farook Kaleem, Bridgewater, NJ (US); Sidharth R. Sibal, Martinsville, NJ (US); Amit Mahajan, Bridgewater, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/700,252

(22) Filed: Apr. 30, 2015

(51) Int. Cl.
| H04W 4/00 | (2009.01) |
| H04W 4/12 | (2009.01) |
| G06F 1/16 | (2006.01) |
| G06F 3/16 | (2006.01) |
| G06F 3/0481 | (2013.01) |
| H04M 1/725 | (2006.01) |

(52) U.S. Cl.
CPC ............ *H04W 4/12* (2013.01); *G06F 1/163* (2013.01); *G06F 3/04817* (2013.01); *G06F 3/167* (2013.01); *H04M 1/72552* (2013.01); *H04W 4/003* (2013.01)

(58) Field of Classification Search
CPC ....................................................... H04W 4/12
See application file for complete search history.

(56) References Cited

U.S. PATENT DOCUMENTS

| 6,728,341 | B1 * | 4/2004 | Puchek | G06Q 10/10 379/38 |
| 9,020,848 | B1 * | 4/2015 | Ridge | G06Q 40/125 705/32 |
| 2005/0259641 | A1 * | 11/2005 | Beninato | H04L 29/06 370/354 |
| 2006/0208878 | A1 * | 9/2006 | Nowlan | G08B 21/0258 340/539.13 |
| 2010/0267361 | A1 * | 10/2010 | Sullivan | G01S 19/17 455/404.2 |
| 2011/0234397 | A1 * | 9/2011 | Fetzer | G08B 21/0261 340/539.13 |
| 2013/0109342 | A1 * | 5/2013 | Welch | B60N 2/002 455/404.2 |
| 2014/0323104 | A1 * | 10/2014 | Derrick | G07C 1/20 455/414.1 |

* cited by examiner

*Primary Examiner* — Mazda Sabouri

(57) ABSTRACT

A user device includes a controlling application for a child's wearable device. A network device receives configuration settings for an event widget that activates the wearable device to send a prepared text message to a trusted contact and to receive a pre-recorded audio message from the trusted contact. The network device downloads the event widget to the wearable device and receives a selection signal that the event widget was selected. The network device authorizes the wearable device to send the prepared text message to the trusted contact when the widget selection time or current location for the wearable device matches the stored configuration settings. The network device receives, from the trusted contact, an acknowledgement of the prepared text message and sends the pre-recorded audio message to the wearable device. The network device facilitates communications between the trusted contact and the controlling application to provide live video from the user device.

20 Claims, 12 Drawing Sheets

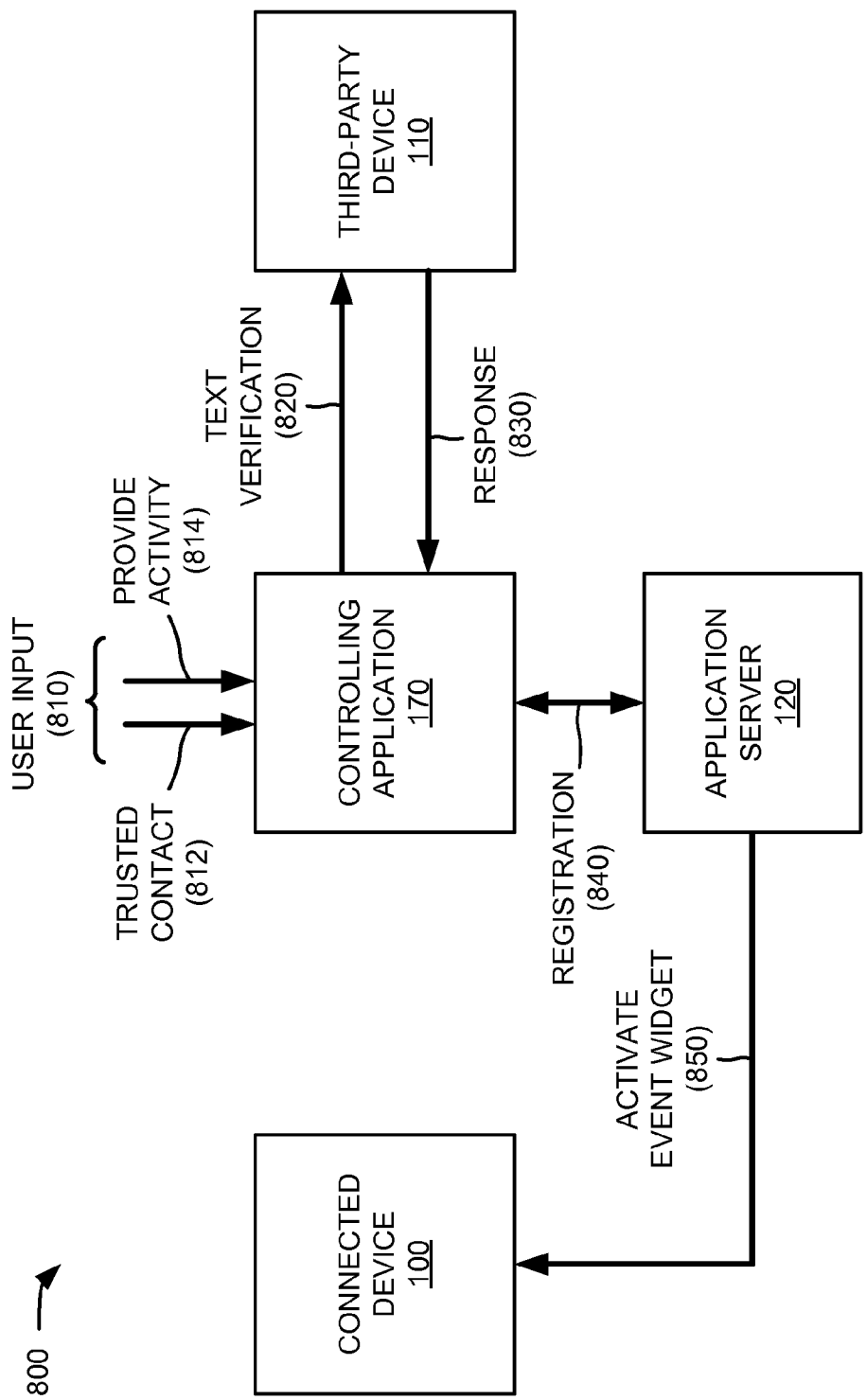

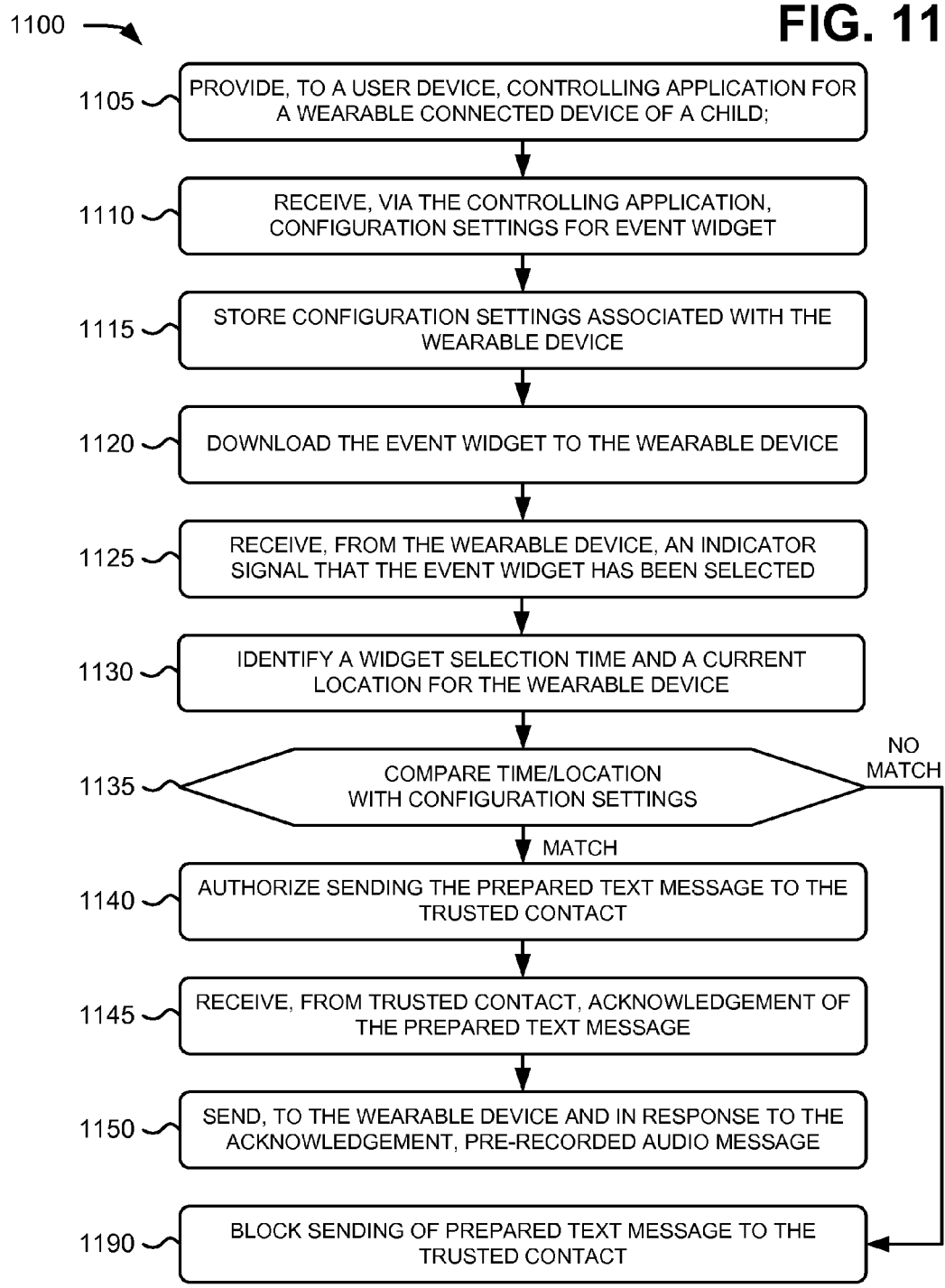

NOTIFICATIONS FOR CONNECTED WEARABLE DEVICES

BACKGROUND

Connected wearable devices are becoming a popular mobile communication option. For children considered too young for cellular telephones and smartphones, connected wearable devices can provide simple two-way communications to a limited number of guardians and allow for monitoring a child's whereabouts.

BRIEF DESCRIPTION OF THE DRAWINGS

FIG. 8 is a diagram illustrating exemplary communications to activate an event-based communication feature in a portion of the network of FIG. 2;

FIG. 11 is a flow diagram illustrating an exemplary process for implementing a notification service for connected wearable devices, according to an implementation described herein.

DETAILED DESCRIPTION OF PREFERRED EMBODIMENTS

The following detailed description refers to the accompanying drawings. The same reference numbers in different drawings may identify the same or similar elements.

Systems and methods described herein may provide notifications to and from trusted contacts for users of connected wearable devices (also referred to herein as a "connected device" or "wearable device") in a manner that resembles social media interaction. The connected wearable devices may generally be used by children, and their notifications can be controlled/restricted through use of a controlling application 170 that resides, for example, on a parent's smart phone.

Figure 1:
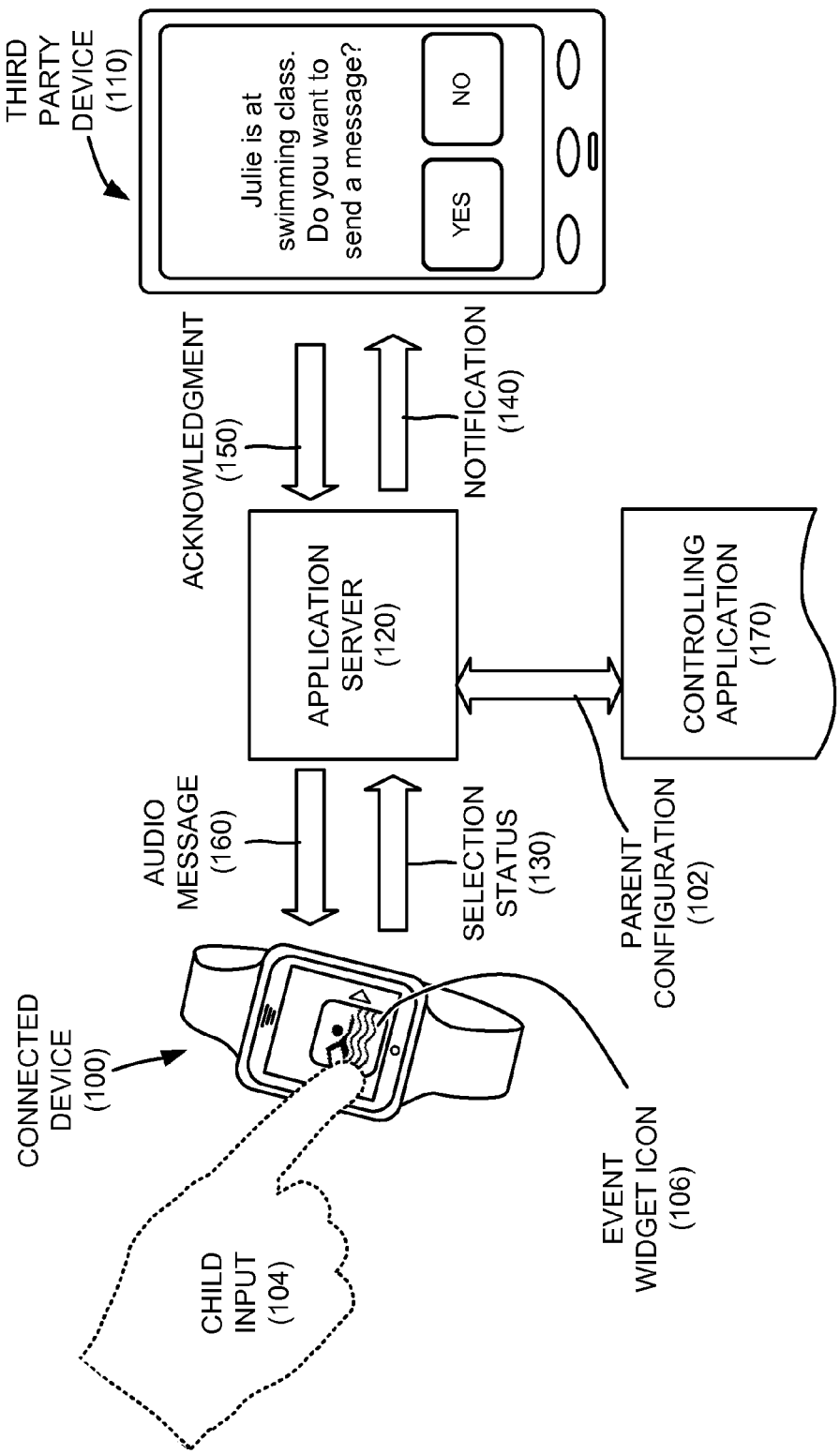
FIG. 1 is a diagram illustrating concepts described herein.

FIG. 1 is a diagram illustrating concepts described herein. As shown in FIG. 1, a connected device 100, such as a wearable communication device for a child, may be configured for use by a controlling application 170 that resides, for example, on a parent's user device (not shown in FIG. 1). Using controlling application 170, a parent may configure an event widget (e.g., an interactive mobile application with limited functionality) for connected device 100. The event widget may be associated with a particular activity and a trusted contact using a third-party device 110. An activity may include a recurring event with a known time or location, such as an instructional class (e.g., swimming, taekwondo, religious education, baseball practice, etc.), home sporting event, or after school care. Configuring the event widget may also include storing a notification text message (e.g., to be provided to the trusted contact) and storing a response audio (e.g., a recording from the trusted contact). The event widget settings may be provided to connected device 100 based on parent configuration 102.

Selection of the event widget may activate connected device 100 to send a prepared text message to the trusted contact and to receive a pre-recorded audio message from the trusted contact. A user of connected device 100 may provide child input 104 to activate the event widget by selecting an event widget icon 106. In response to child input 104, connected device 100 may initiate an event notification to a third-party device 110. In particular, connected device 100 may provide selection status message 130 to application server 120. Application server 120 may detect the location of connected device 100 and/or a time that the widget is selected to confirm that a child input/selection is valid for the particular event widget. For example, application server 120 may confirm that the current location of connected device 100 corresponds to the configured location for the event widget. If selection status message 130 is verified, the previously-stored text message (from parent configuration 102) may be provided to third-party device 110 as notification 140. Using third-party device 110, the trusted contact may reply with acknowledgement 150. Application server 120 may receive acknowledgement 150 and, in response, deliver the response audio to connected device 100 as audio message 160.

Using the systems and methods described herein, a parent or guardian can use controlling application 170 to configure a trusted network of relatives or friends (referred to herein as "trusted contacts") that will be notified, upon the child's request, of a child's particular activities. The trusted contacts can provide an active response to the notification to cause pre-recoded audio input to be presented on the child on connected device 100. The systems and methods may employ use of text messaging (e.g., short message service (SMS) messages) to permit easy communications to/from trusted contacts without requiring the trusted contacts to access a social network account or rely on Internet Protocol (IP)-based communications. In other implementations, a video sharing channel may be set up so that trusted contacts that provide an active response to the notification are given an option to watch a live video stream of the child's event (e.g., using video streaming capabilities of a parent's device).

Figure 2:
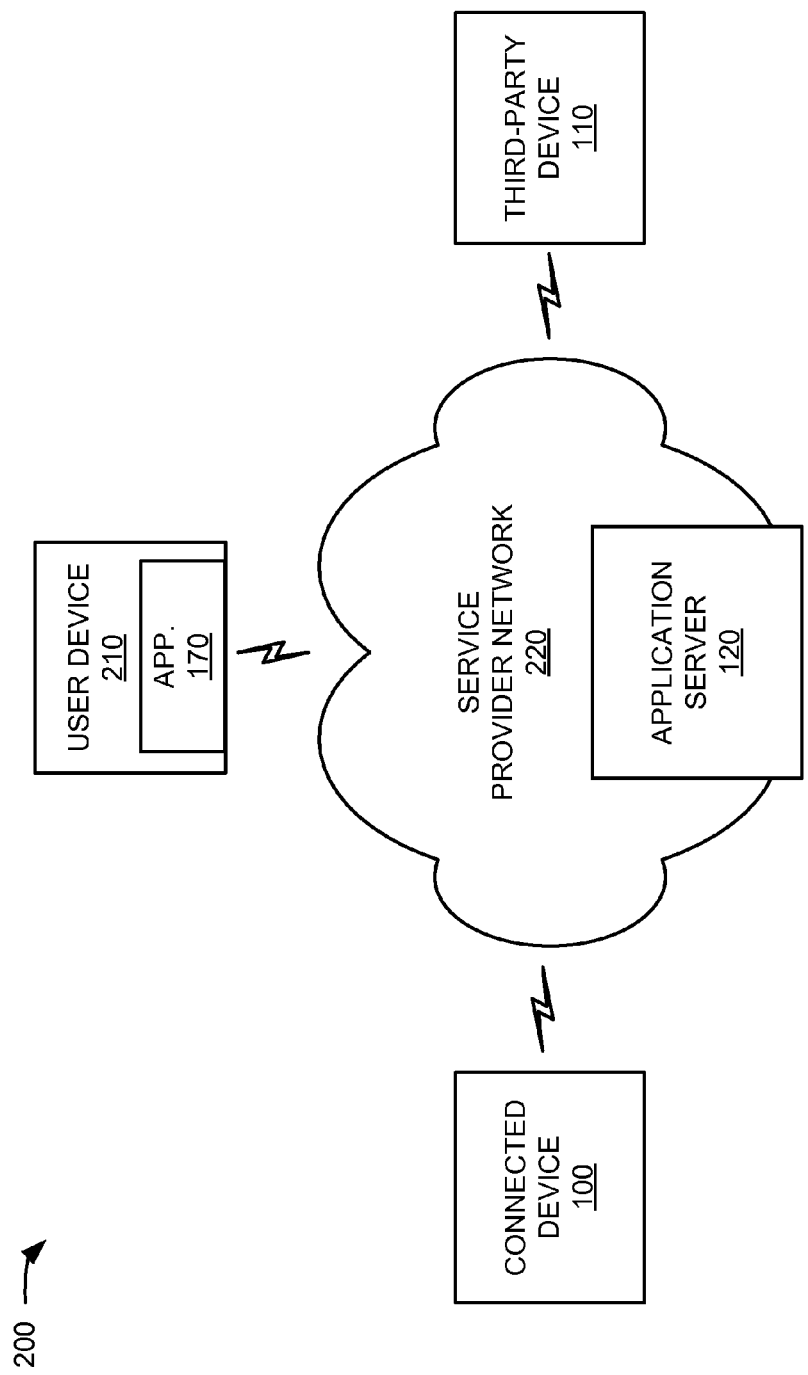
FIG. 2 is a diagram illustrating an exemplary network in which systems and/or methods described herein may be implemented.

FIG. 2 is a diagram illustrating an exemplary network environment 200 in which systems and methods described herein may be implemented. As illustrated, network environment 200 may include connected device 100, third-party device 110, a user device 210 that includes controlling application 170, and a service provider network 220 that includes application server 120. Components of network environment 200 may be connected via wired and/or wireless links.

Connected device 100 may include a communication and/or computational device with specifically-limited capabilities. As shown, for example, in FIG. 1, connected device 100 may take the form of a wristband-mounted device (like a wristwatch). Although not illustrated, other exemplary wearable form factors for connected device 100 may include a pendant style device configured for wearing via a chain or lanyard, a brooch or other pin-on or clip-on on style device, a ring, etc.

Connected device 100 may generally include a capability to receive incoming calls (e.g., voice calls) from other devices and initiate outgoing calls to other devices using a wireless communications network, such as a cellular network. As described further herein, connected device 100 may be a programmable device that may be remotely configured, for example, by use of controlling application 170. In one implementation, connected device 100 may be a wearable mobile communication device that can be programmed to allow communications with only a few pre-programmed contacts, such as phone numbers of devices registered to a parent or guardian. Connected device 100 may be programmed to present an event widget and provide a corresponding event status (e.g., selection status message 130) when the event widget is selected by the user. Connected device 100 may also include Global Positioning System (GPS) or other location-detection functionality.

Third-party device 110 may include a computational and/or communication device, such as a radiotelephone, a smart phone, a personal digital assistant (PDA) (e.g., that can include a radiotelephone, a pager, Internet/intranet access, etc.), a wireless device, a portable computer (e.g., a laptop or tablet computer), a wired telephone, etc. Third-party device 110 may generally include a capability to receive incoming calls (e.g., voice and/or video calls) and messages (e.g., text messages) from other devices. Third-party device 110 may also include a capability to respond to a text message or audio message.

Application server 120 may include one or more network devices or computing devices that generally facilitate verifications, notifications, and call routing to provide notifications for connected wearable devices. Application server 120 may receive configuration settings (e.g., from controlling application 170) for an event widget on connected device 100. Once the event widget is configured, application server 120 may receive and validate event status information (e.g., selection status message 130) from connected device 100 and send notifications (e.g., notifications 140) to one or more trusted contacts. Application server 120 may also receive (e.g., via service provider network 220) acknowledgement (e.g., acknowledgement 150) notifications from third-party device 110, and provide corresponding pre-recorded audio messages to connected device 100. In other implementations, application server 120 may be included as a distributed component and/or integrated within another device of service provider network 220.

User device 210 may include a computational and/or communication device, such as another third-party device 110, a computer (e.g., a personal computer, a laptop computer, or a tablet computer), etc. In one implementation described herein, calling device 110 may be provided with an application (e.g., controlling application 170) to configure and monitor connected device 100.

Service provider network 220 may include network devices that provide telecommunications services and provide a backend support system for facilitating notifications for connected wearable devices. Service provider network 220 may include a local area network (LAN), an intranet, a private wide area network (WAN), a telephone network, such as the Public Switched Telephone Network (PSTN), a metropolitan area network (MAN), a public network, a mobile access network, a mesh network, a fiber-optics network (e.g., passive optical networks (PONS)), or a combination of networks. Service provider network 220 may include, for example, one or more private Internet Protocol (IP) networks that use a private IP address space. Although shown as a single element in FIG. 2, service provider network 220 may include a number of separate networks. Service provider network 220 may permit user device 210 to download controlling application 170 to enable configuration and implementation of event widgets for controlled devices 100. According to an implementation, service provider network 220 may include a mobile access network 220 that transfers/receives information (e.g., voice, data, broadband applications, etc.) to/from a circuit-switched and/or packet-switched network. As an example, the mobile access network may include a long-term evolution (LTE) network, a Code Division Multiple Access (CDMA) network, a Wi-Fi network (e.g., using IEEE 802.11 standards), or other access networks (e.g., an E-UTRAN, an enhanced high-rate packet data (eHRPD) network, or another 3G, 4G, or future wireless network standard).

In FIG. 2, the particular arrangement and number of components of network environment 200 are illustrated for simplicity. In practice there may be more connected devices 100, third-party devices 110, application servers 120, user devices 210, or service provider networks 220. For example, there may be thousands of connected devices 100, third-party devices 110, and/or user devices 210.

Figure 3:
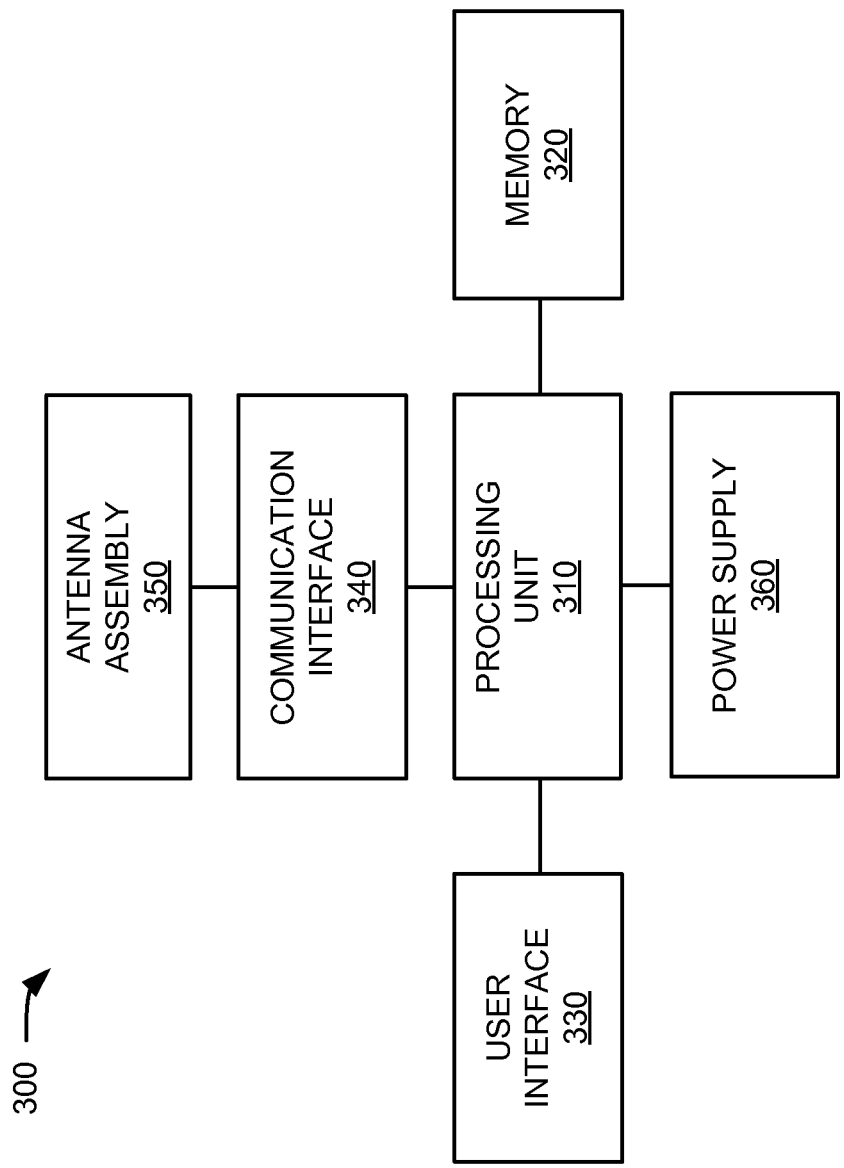
FIG. 3 is a block diagram illustrating exemplary components of a device that may correspond to a connected wearable device, a third-party device, or a user device of FIG. 2.

FIG. 3 is a diagram illustrating exemplary components of a device 300, according to an implementation described herein. Each of connected device 100, third-party device 110, or user device 210 may be implemented as a combination of hardware and software on one or more of device 300. As shown in FIG. 3, device 300 may include a processing unit 310, a memory 320, a user interface 330, a communication interface 340, and an antenna assembly 350.

Processing unit 310 may include one or more processors, microprocessors, application specific integrated circuits (ASICs), field programmable gate arrays (FPGAs), and/or other processing logic. Processing unit 310 may control operation of device 300 and its components.

Memory 320 may include a random access memory (RAM) or another type of dynamic storage device, a read only memory (ROM) or another type of static storage device, a removable memory card, and/or another type of memory to store data and instructions that may be used by processing unit 310.

User interface 330 may allow a user to input information to device 300 and/or to output information from device 300. Examples of user interface 330 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as a liquid crystal display (LCD), to output visual information; an actuator to cause device 300 to vibrate; a sensor; and/or any other type of input or output device. When device 300 is a connected device 100, user interface 300 may include limited input and output options. For example, a connected device 100 may include a speaker, a microphone, and an interface to display and select an event widget.

Communication interface 340 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 340 may include a transmitter that converts baseband signals to radio frequency (RF) signals and/or a receiver that converts RF signals to baseband signals. Communication interface 340 may be coupled to antenna assembly 350 for transmitting and receiving RF signals.

Communication interface 340 may include a logical component that includes input and/or output ports, input and/or output systems, and/or other input and output components that facilitate the transmission of data to other devices. For example, communication interface 340 may include a network interfaces for wired communications and/or a wireless network interfaces (e.g., Wi-Fi) for wireless communications. Communication interface 340 may also include a universal serial bus (USB) port for communications over a cable, a Bluetooth™ wireless interface, a radio-frequency identification (RFID) interface, a NFC wireless interface, and/or any other type of interface that converts data from one form to another form.

Antenna assembly 350 may include one or more antennas to transmit and/or receive RF signals. Antenna assembly 350 may, for example, receive RF signals from communication interface 340 and transmit the signals via an antenna and receive RF signals from an antenna and provide them to communication interface 340.

Power supply 360 may include one or more batteries or other portable power source components used to supply power to components of device 300. Power supply 360 may also include control logic to control application of power from an external power source (e.g., a charger) to one or more components of device 300.

As described herein, device 300 may perform certain operations in response to processing unit 310 executing software instructions contained in a computer-readable medium, such as memory 320. A computer-readable medium may be defined as a non-transitory memory device. A non-transitory memory device may include memory space within a single physical memory device or spread across multiple physical memory devices. The software instructions may be read into memory 320 from another computer-readable medium or from another device via communication interface 340. The software instructions contained in memory 320 may cause processing unit 310 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 3 shows example components of device 300, in other implementations, device 300 may include fewer components, different components, differently-arranged components, or additional components than those depicted in FIG. 3. Additionally or alternatively, one or more components of device 300 may perform the tasks described as being performed by one or more other components of device 300.

Figure 4:
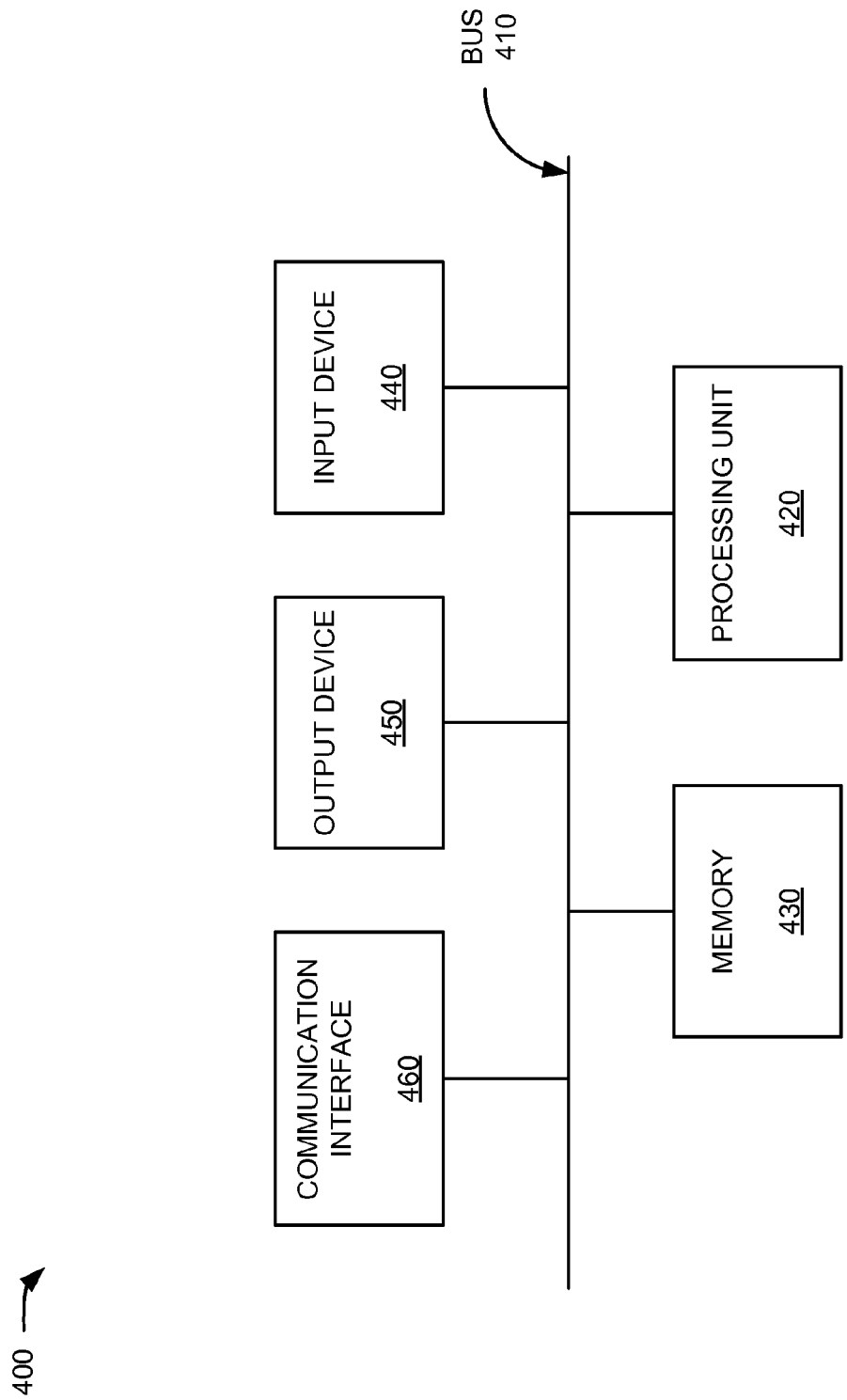
FIG. 4 is a block diagram illustrating exemplary components of a device that may correspond to one or more of the devices of FIG. 2.

FIG. 4 is a diagram illustrating exemplary components of a device 400. Each of third-party device 110, application server 120, user device 210, and/or some other devices (not shown) in service provider network 220 may be implemented/installed as a combination of hardware and software on one or more of device 400. As shown in FIG. 4, device 400 may include a bus 410, a processing unit 420, a memory 430, an input device 440, an output device 450, and a communication interface 460.

Bus 410 may permit communication among the components of device 400. Processing unit 420 may include one or more processors or microprocessors that interpret and execute instructions. In other implementations, processing unit 420 may be implemented as or include one or more application specific integrated circuits (ASICs), field programmable gate arrays (FPGAs), or the like.

Memory 430 may include a random access memory (RAM) or another type of dynamic storage device that stores information and instructions for execution by processing unit 420, a read only memory (ROM) or another type of static storage device that stores static information and instructions for the processing unit 420, and/or some other type of magnetic or optical recording medium and its corresponding drive for storing information and/or instructions.

Input device 440 may include a device that permits a user to input information to device 400, such as a keyboard, a keypad, a mouse, a pen, a microphone, one or more biometric mechanisms, and the like. Output device 450 may include a device that outputs information to the user, such as a display, a speaker, etc.

Communication interface 460 may include any transceiver-like mechanism that enables device 400 to communicate with other devices and/or systems. For example, communication interface 460 may include mechanisms for communicating with other devices, such as other devices of network environment 200.

As described herein, device 400 may perform certain operations in response to processing unit 420 executing software instructions stored in a computer-readable medium, such as memory 430. The software instructions may be read into memory 430 from another computer-readable medium or read into memory 430 from another device via communication interface 460. The software instructions stored in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of device 400, in other implementations, device 400 may include fewer components, different components, differently-arranged components, or additional components than those depicted in FIG. 4. As an example, in some implementations, a display may not be included in device 400. In these situations, device 400 may be a "headless" device that does not include input device 440. Alternatively, or additionally, one or more components of device 400 may perform one or more other tasks described as being performed by one or more other components of device 400.

Figure 5:
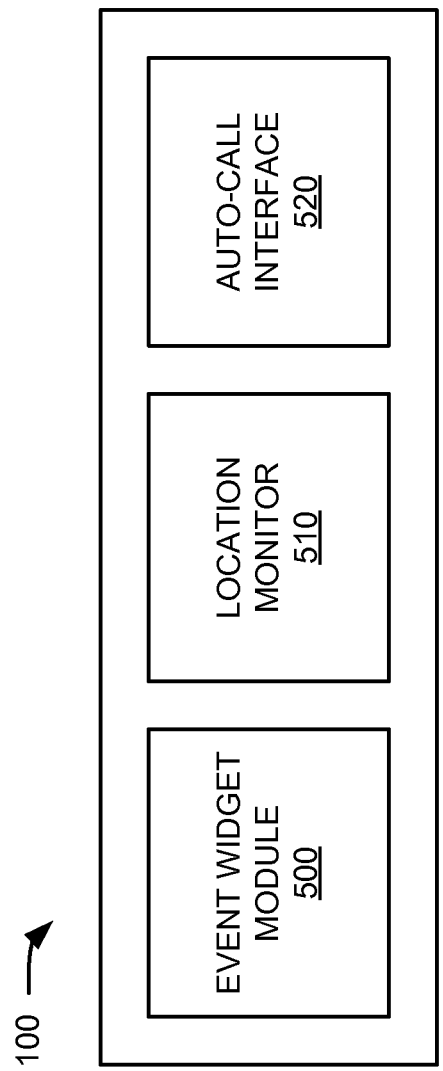
FIG. 5 is a block diagram illustrating exemplary functional components of the connected device of FIG. 2.

FIG. 5 is a block diagram illustrating an exemplary functional component of connected device 100. The functional components of FIG. 5 may be implemented, for example, by processing unit 310 in conjunction with memory 320. As shown in FIG. 5, connected device 100 may include an event widget module 500, a location monitor 510, and an auto-call interface 520.

Event widget module 500 may include an application to present an icon for an event widget and receive user input (e.g., from a child) to select the icon. In another implementation, a selection may be implemented via a keypad sequence assigned for the widget (in place of an icon). Event widget 500 may respond to the selection by signaling application server 120 with an event status. Event status may indicate selection of the event widget by the user. In one implementation, the event status may include GPS or other location-based information. In another implementation, event widget module 500 may include time and/or contact information (e.g., a stored phone number and/or text message) associated with selection of a particular event widget icon and send the time/contact information with the event status.

Location monitor 510 may provide location updates to event widget module 500 and/or application server 120. Location monitor 510 may communicate, for example, with an external locator system. Location monitor 510 may include, for example, GPS functionality, assisted-GPS, or other location-determination technology. Location monitor 510 may conduct location queries 445 in response to a user's selection of an event widget. Location monitor 510 may also conduct periodic location queries to determine the current location of connected device 100. Periodic location queries may be conducted, for example, every few seconds or minutes. Location information from location monitor 510 may be provided in the form of, for example, GPS coordinates, latitude and longitude coordinates, or other geo-position coordinates. In one example implementation, location monitor 510 may rely only on a GPS satellite to determine a location of connected device 100. In another example implementation, a position determining entity (e.g., a network server) may assist location monitor 510 in determining GPS coordinates by providing ephemeris data to location monitor 510 to allow faster identification of satellites within view of connected device 100.

Auto-call interface 520 may apply commands from event widget module 500 to connect voice calls to/from application server 120, third-party device 110, or user device 210. Additionally, auto-call interface 520 may block incoming calls (or outgoing calls) from devices that are not pre-registered for connected device 100.

Figure 6:
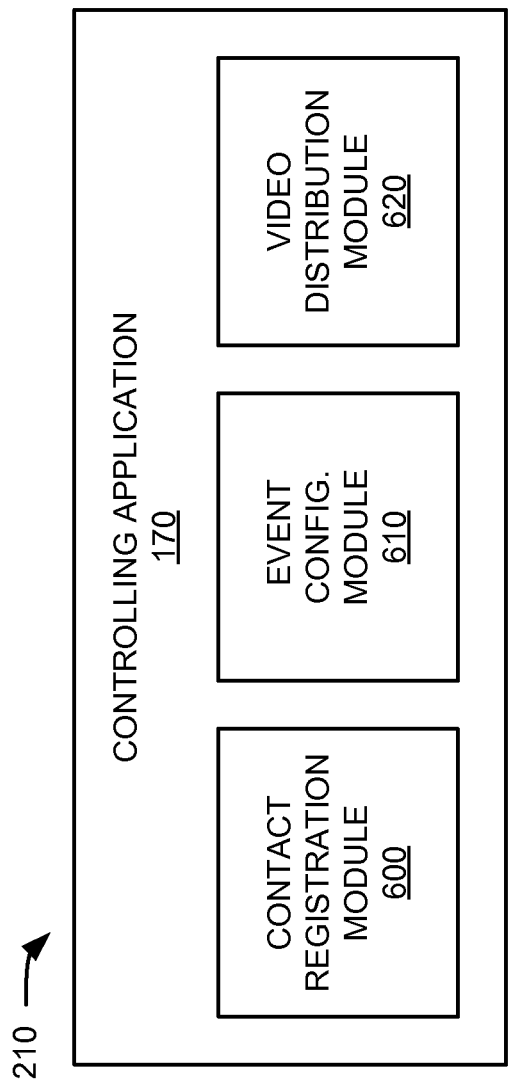
FIG. 6 is a block diagram illustrating exemplary functional components of the user device of FIG. 2.

FIG. 6 is a block diagram illustrating an exemplary functional component of user device 210. The functional components of FIG. 6 may be implemented, for example, by processing unit 310 in conjunction with memory 320 or processing unit 420 in conjunction with memory 430. In another implementation, functional components of FIG. 6 may be implemented via a web browser interface in conjunction with application server 120. As shown in FIG. 6, user device 210 may include controlling application 170 that includes a setup module 600, an event configuration module 610, a screening module 620, and a video distribution module 630. In other implementations, controlling application 170 may include additional functional components (not shown) to manage, for example, monitoring of connected device 100, features of connected device 100 (e.g., auto-answering), reminders, etc.

Controlling application 170 may generally include an application to manage settings for connected device 100, such as updating/adding event widgets and trusted contacts. In one implementation, controlling application 170 may also retrieve and present location information for connected device 100, provide location notifications for connected device 100 at scheduled times, etc. In one implementation, controlling application 170 may be included as part of an operating system (OS) or OS upgrade for user device 210. In another implementation, controlling application 170 may be included as a separate application. In still another implementation, controlling application 170 may be accessing through a secure web browser. Access to controlling application 170 may be restricted, for example, by password protection or other authentication techniques.

Contact registration module 600 may provide a user interface to configure and activate a trusted contact for connected device 100. For example, contact registration module 600 may include a user interface to solicit details for a particular trusted contact, such as a grandparent or other relative. In one implementation, the trusted contact may not otherwise be associated with or have access to a subscription (e.g., a subscription wireless plan) for connected device 100 and user device 210. Contact registration module 600 may permit a user of controlling application 170 to enter phone numbers, relationship, names, email addresses, etc. of the relatives or friends. Trusted contact information may be saved locally on user device 210 (e.g., in memory 320) and/or uploaded to application server 120. According to an implementation described herein, a trusted contact for an event widget may not have access to controlling application 170 or the wireless subscription plan as connected device 100.

Event configuration module 610 may be used to setup and activate an event widget for connected device 100. Event configuration module 610 may provide a user interface to solicit, for example, an event name, a widget icon, an event time, an event location, a trusted contact, and a notification message associated with an event widget. The event name may include any alpha-numeric description of an activity. The widget icon may include a visual image that can be presented for selection by the user of connected device 100 (e.g., a child). The visual image may be selected, for example, from a group of stored images (store icons) from application server 120, a picture stored locally on user device 210 (e.g., a picture of the event location), clip art, etc. The time may include a range of time for an event, such as a start time, and end time, and periodicity (e.g., daily, weekdays, every Monday, etc.). The location may include an event location. The location may include an address entered by the user of controlling application 170 or location coordinates. For example, the location may include GPS coordinates obtained from either connected device 100 or user device 210 when located at the event. The trusted contact associated with the widget may be selected from one or more trusted contacts entered via contact registration module 600. In one implementation, information received by event configuration module 610 may be stored in a remote activity register associated with connected device 100, such as activities database 710 described below. A notification message may include prepared (e.g., "canned") text that can be included in an SMS message or other text-based notification that is provided to the trusted contact when a user of connected device 100 selects the event widget (and the selection is validated).

Event configuration module 610 may also be used to receive and upload recorded messages from trusted contacts. For example, once a person is established as a trusted contact, he or she can pre-record personal messages for the child (such as "Good luck with swimming! We are very proud of you.") that can be associated with a particular event widget and played on connected device 100 when a child selects the event widget. In one implementation, recordings can be facilitated though controlling application 170 (e.g., on a parents device) to record a portion of a live conversation or telephone message. In other implementations, a trusted contact may be granted limited access to controlling application 170 via a web-based interface to record and upload audio files.

In addition to information input from controlling application 170, in one implementation, event configuration module 610 may also assign a unique event widget identifier (ID) for each new event widget and may associate the widget ID with connected device 100. In one implementation, controlling application 170 or application server 120 will not activate an event widget on connected device 100 unless all required entries are provided to event configuration module 610.

Video distribution module 620 may generally enable video sharing from user device 210 via a private video channel. In one implementation, video distribution module 620 may solicit confirmation of compliance with privacy terms at the physical site of the video recording before enabling the video sharing. For example, video distribution module 620 may request acknowledgement that the user of controlling application 170 is aware of the local video recording policy and that distribution via controlling application 170 would be compliant with the local video recording policy. In some implementations, video distribution module 170 may launch another application such as PERISCOPE, MEERKAT, SKYPE, etc. to facilitate video sharing with one or more trusted contacts.

Figure 7:
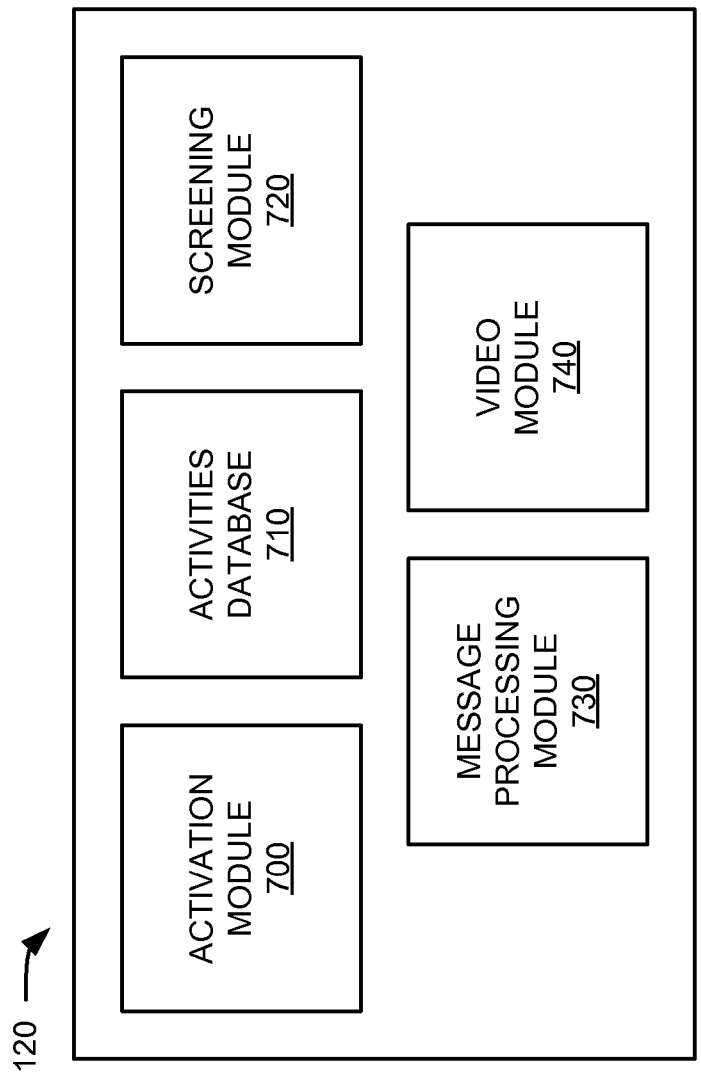
FIG. 7 is a block diagram illustrating exemplary functional components of the application server of FIG. 2.

FIG. 7 is a block diagram illustrating exemplary functional components of application server 120. The functional components of FIG. 7 may be implemented by, for example, processing unit 420 in conjunction with memory 430. As shown in FIG. 7, application server 120 may include an activation module 700, an activities database 710, a screening module 720, a message processing module 730, and a video module 740.

Activation module 700 may solicit and accept activation signals and widget configuration information from controlling application 170 (e.g., via event configuration module 610). Activation module 700 may receive widget configuration information from controlling application 170 and assign a unique event widget ID. As described further herein, in one implementation, the unique event widget ID may be provided to connected device 100 and included in an event status (e.g., selection status message 130) sent from connected device 100 in response to selection of an event widget by the user of connected device 100. Activation module 700 may store event widget information (e.g., connected device ID, event widget ID, event name, widget icon, time, location, trusted contact, notification messages, pre-recorded audio messages, etc.) in activities database 710. Activation module 700 may also provide verification text messages to third-party devices to register a new trusted contact.

Activities database 710 may store (e.g., in a memory 430) widget configuration information in association with a connected device ID and event widget ID.

Screening module 720 may receive a widget selection status message (e.g., selection status message 130) from connected device 100 and perform a lookup in activities database 710 to validate use of the selected event widget. For example, screening module 720 may match an event widget ID from the widget selection message with a stored event widget ID in activities database 710. Screening module 720 may obtain a location of connected device 100 and compare the location of connected device 100 with the stored event location from activities database 710. Additionally, or alternatively, screening module 720 may compare the current time of the widget selection message with the stored event time from activities database 710. If the event locations and/or the event times match, screening module 720 may permit message processing module 730 to send a pre-selected message to the trusted contact associated with the event widget.

Message processing module 730 may manage notification of third-party devices 110 and relaying pre-recorded messages to connected device 100. Message processing module 730 may receive call processing instructions from activation module 700, activities database 710, and/or screening module 720. In one implementation, message processing module 730 may receive instructions to send a message to third-party device 110 (e.g., based on a determination by screening module 720 that a widget selection message from connected device 100 is valid). In response to the instructions to send a message, message processing module 730 may retrieve stored pre-selected text from activities database 710 and send a text message to the phone number associated with the trusted contact for the selected event widget. A user of third-party device 110 may respond to the text message with a reply text message to acknowledge availability and initiate sending of their pre-recorded message.

In another implementation, instead of a text message, message processing module 730 may generate an audio message of the pre-selected text and conduct a voice-based call using an interactive voice response (IVR) system that allows a user of third-party device 110 to select an option from a voice menu or otherwise interface with message processing module 730. Message processing module 730 may, for example, play pre-recorded voice prompts to which the user of third-party device 110 may respond by either pressing a number on a telephone keypad or by speaking a response to acknowledge the pre-selected message.

Based on the text-based or voice-based response from third-party device 110, message processing module 730 may retrieve the pre-recorded audio message, associated with the selected event widget, from activities database 710 and initiate a call to connected device 100 that plays the pre-recorded message. If there is no text-based or voice-based response from third-party device 110, or if the response is not provided within the time range of the event, no further action is taken by message processing module 730.

Video module 740 may provide video notifications to trusted contacts who acknowledge an activity notification from an event widget. For example, when application server 120 receives an acknowledgement from third-party device 110, video module 740 may send another text message to ask if the trusted contact is interested in watching live video of the child's event. In another implementation, video module 740 may first provide an inquiry to user device 210/controlling application 170 to determine if live video is available (e.g., if parent is able to stream video from user device 210) before sending the text message to ask if the trusted contact is interested in watching live video. Video module 740 may facilitate communications with controlling application 170 to set up a live video stream using, for example, a camera of user device 210.

FIG. 8 is a diagram of exemplary communications among devices in a portion 800 of network environment 200. Communications in FIG. 8 may represent communications for activating an event-based communication feature on a connected device. As shown in FIG. 8, network portion 800 may include connected device 100, third-party device 110, application server 120, and controlling application 170. Connected device 100, third-party device 110, application server 120, and controlling application 170 may include features described above in connection with FIGS. 1-7.

As shown in FIG. 8, a user of controlling application 170 may provide user input 810 to set up an event widget. User input 810 may include supplying a trusted contact 812 for connected device 100 as described above in connection with contact registration module 600 (FIG. 6) and providing an activity 814 for connected device 100 as described above in connection with event configuration module 610 (FIG. 6). In one implementation, a contact number for the trusted contact may be associated with a text-enabled device (e.g., third-party device 110). In another implementation, the contact number for the trusted contact may be associated with a voice-based device that can interact with an IVR system. As shown in FIG. 8, for a text-based third-party device 110, controlling application 170 may initiate a text verification message 820 to third-party device 110. Third-party device 110 may provide a response 830 to verify message 820 and confirm association as a trusted contact for connected device 100. A similar exchange may be used for IVR responses.

Assuming receipt of response 830, controlling application 170 may register the trusted contact 812 and provide activity 814 with application server 120. Registration 840 may include controlling application 170 providing information for the trusted contact and activity associated with connected device 100. Application server 120 may store the information (e.g., in activities database 710) and assign a unique event widget ID. Application server 120 may then activate the event widget 850 on connected device 100. For example, application server 120 may download the widget icon and unique event widget ID to connected device 100.

Figure 9A:
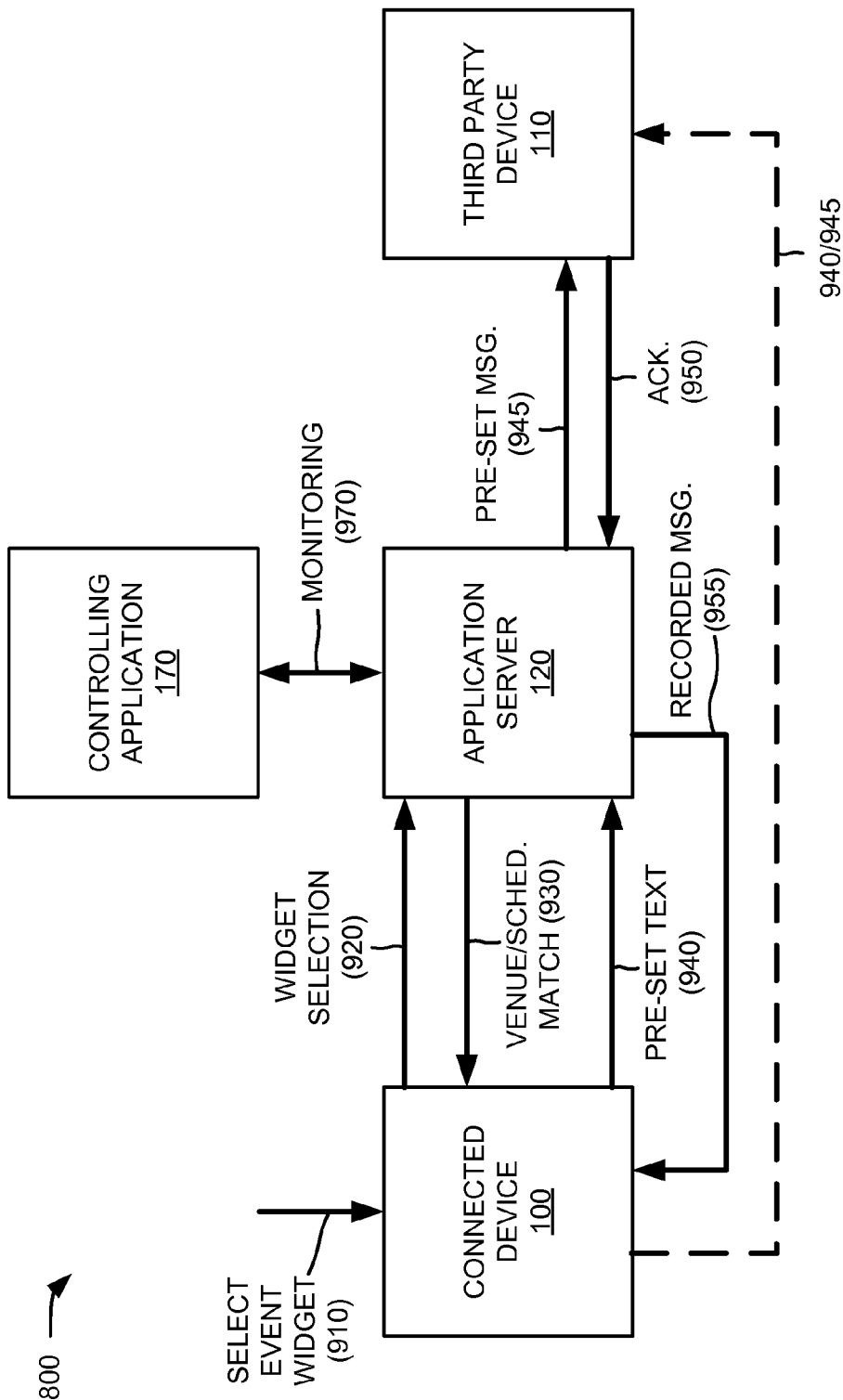
FIGS. 9A and 9B are diagrams illustrating exemplary communications to conduct an event-based communication in a portion of the network of FIG. 2.
Figure 9B:
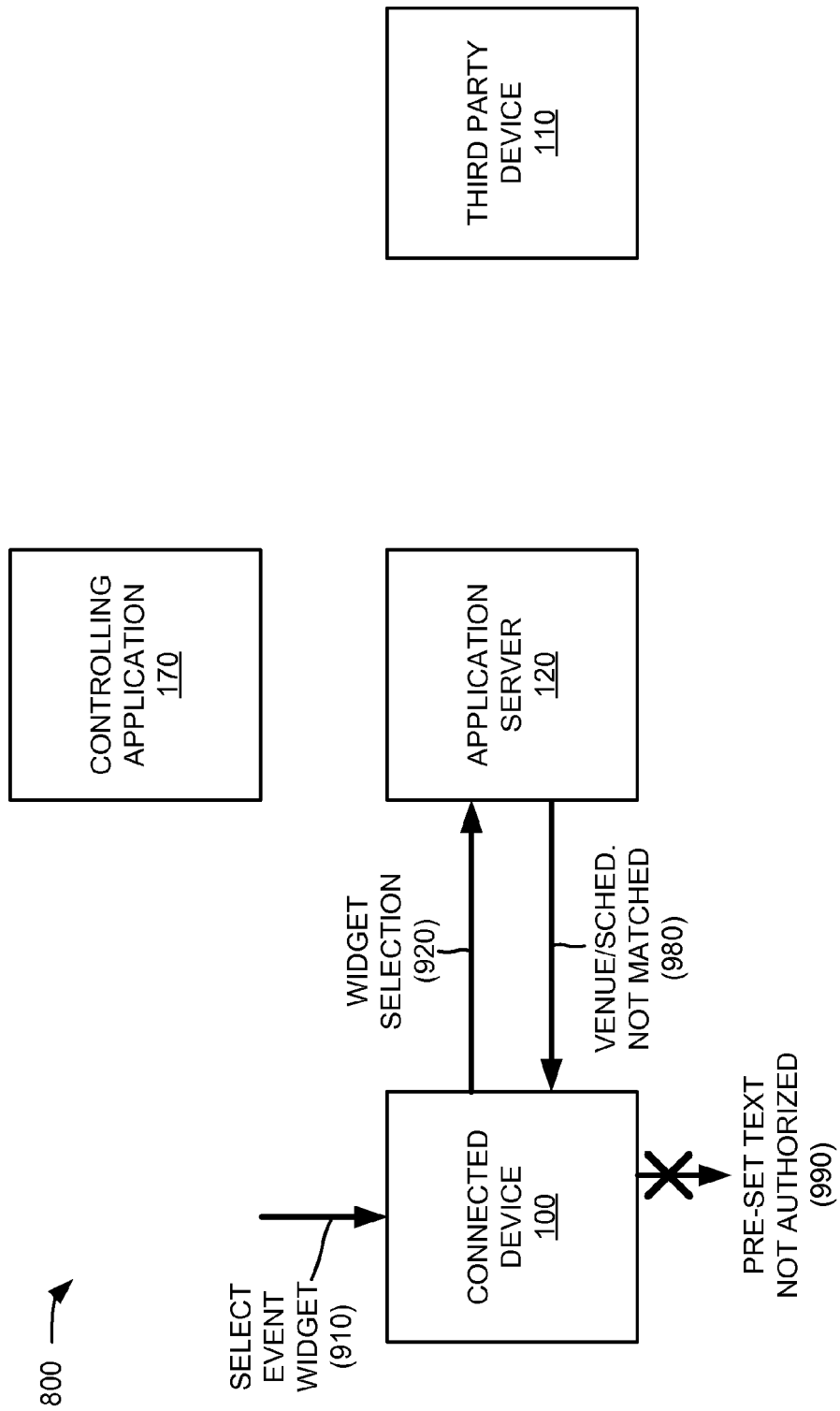

FIGS. 9A and 9B are diagrams of additional exemplary communications among devices in portion 800 of network environment 200. Communications in FIGS. 9A and 9B may represent communications for conducting an event-based communication.

As shown in FIG. 9A, a user of connected device 100 (e.g., a child) may select an event widget, as indicated by reference 910. In response, connected device 100 may generate a widget selection message 920 that may be received by application server 120. Application server 120 (e.g., screening module 720) may ensure that the widget selection time and/or location of connected device 100 match the registered time and location for the event widget. Assuming the venue and/or times match (or are within a predetermined range of time/distance), application server 120 may provide a confirmation 930 indicating a match. Connected device 100 may receive confirmation 930 and may send a pre-selected text message 940 (e.g., an SMS message) to application server 120. Application server 120 may forward the pre-selected text message as pre-set message 945 to third-party device 110 of the trusted contact indicating, for example, that the child using connected device 100 is at a particular activity and prompting a reply. In one implementation, application server 120 may simply forward the original text message from connected device 100. In another implementation, application server 120 may convert the pre-set text 940 to an audio message that can be delivered over an IVR system to third-party device 110. Alternatively, the event widget on connected device 100 may be configured to send a text message directly to third-party device 110 (such that communications 940 and 945 are accomplished in a single step).

Third-party device 110 may receive pre-set message 945, and a user of third-party device 110 may respond with an acknowledgement 950. Acknowledgement 950 may include, for example, a text message reply or a response to an IVR prompt that can be received by application server 120. Application server 120 may receive acknowledgement 950 and, in response, may place an audio call to connected device 100 to play recorded message 955. As shown by reference 970, controlling application 170 may communicate with application server 120 to monitor incoming and outgoing communications for connected device 100. Monitoring 970 may include, for example, application server 120 providing periodic logs, real-time updates, or ad-hoc reports.

Referring to FIG. 9B, assume the user of connected device 100 (e.g., a child) selects an event widget, as indicated by reference 910, at a time and/or while at a location that does not match the registered time and location for that event widget.

In response, connected device 100 may generate a widget selection message 920 that may be received by application server 120. Application server 120 (e.g., screening module 720) confirm that the time and/or location of connected device 100 do not match the registered time and location for the event widget. If there is not a match, application server 120 may provide a rejection 930 indicating there is not a match. Alternatively, application server 120 may simply not respond to widget selection 920. If connected device 100 receives rejection 980 or if connected device receives no response to widget selection 920, connected device 100 will not send pre-set text to application server 120, as indicated by reference 990.

Figure 10:
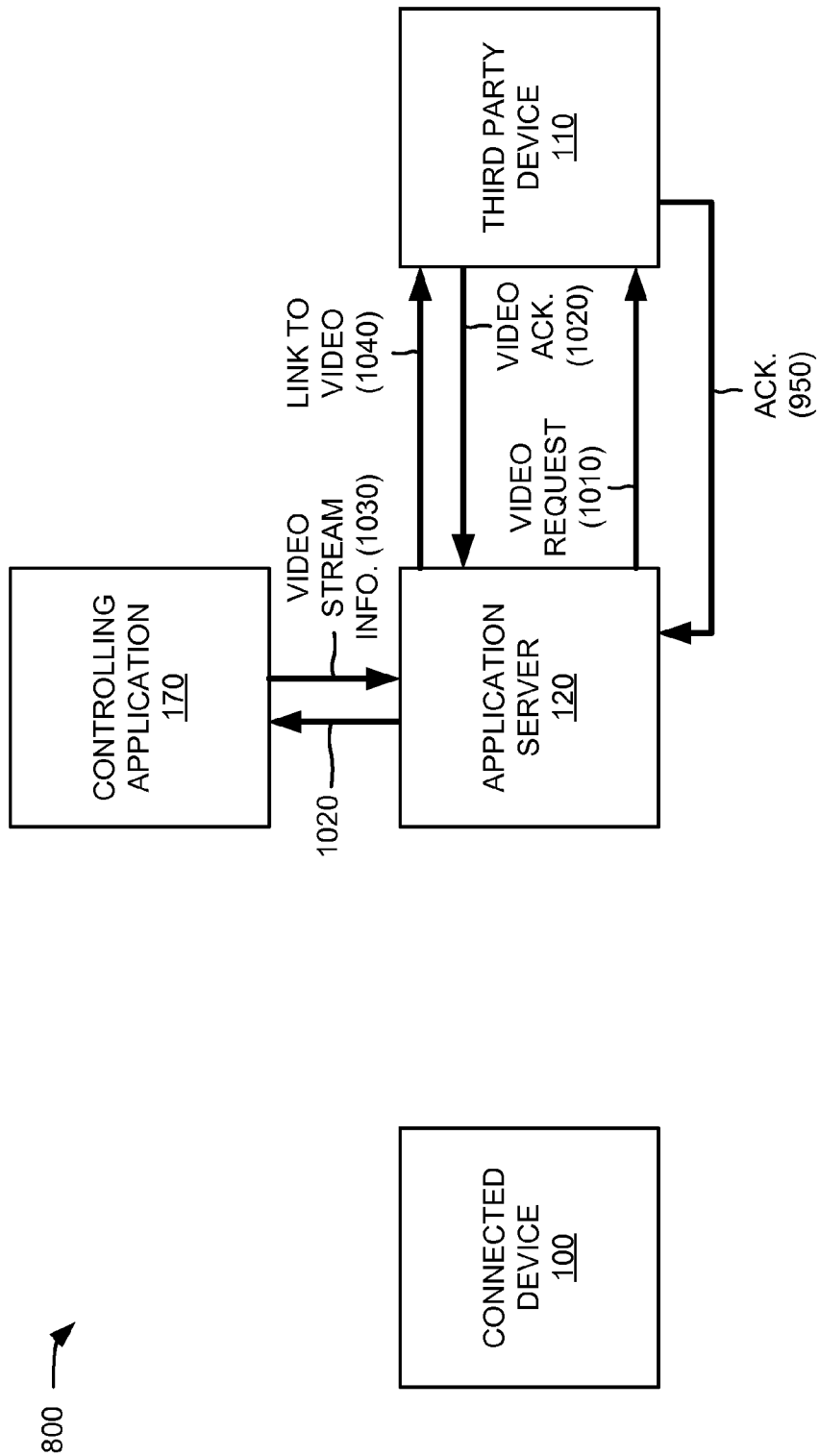
FIG. 10 is a diagram illustrating exemplary communications to provide video streaming of an event in a portion of the network of FIG. 2.

FIG. 10 is a diagram of further exemplary communications among devices in portion 800 of network environment 200. Communications in FIG. 10 may represent communications to provide video streaming of an event. As shown in FIG. 10, in an additional aspect, application acknowledgement 950 may also prompt application server 120 to send a video request 1010 to third-party device 110. Video request 1010 may inquire whether the trusted contact is interested in watching a video (from user device 210) of the activity associated with the event widget. In one implementation, video request 1010 may be provided as a text-based message (e.g., an SMS message). Assuming the trusted contact is interested in seeing the video, third-party device 110 may send a video acknowledgement message 1020 to application server 120, which may be forwarded to controlling application 1020. In another implementation, video acknowledgement message 1020 may be provided as a text message directly to user device 210.

In response to video acknowledgement message 1020, controlling application 170 may associate with another application to generate a secure streaming link to live video from user device 210. For example, controlling application 170 (e.g., video distribution module 620) may request acknowledgement that the user of controlling application 170 is aware of the local video recording policy and may establish a live video feed so that the user of controlling application 170 can provide video of a child's event. Assuming the user of controlling application 170 elects to share video with the trusted contact, controlling application 170 may provide video stream information 1030 to application server 120. In turn, application server 120 may provide a link 1040 to access the secure video stream. In one implementation, link 1040 may restrict access to previously registered devices (e.g., associated with the trusted contact) or require a password to access the video.

FIG. 11 is a flow diagram illustrating an exemplary process 1000 for implementing a notification service for connected wearable devices according to an implementation described herein. In one implementation, process 1100 may be performed by connected device 100, application server 120, and user device 210. In another implementation, some or all of process 1100 may be performed by another device or group of devices.

Process 1100 is further illustrated in the context of the use case of a child attending a scheduled swimming lesson. The child wears connected device 100 which is able to be configured via controlling application 170 on user device 210 (e.g., mom's smart phone).

As shown in FIG. 11, process 1100 may include providing, to a user device of a guardian, a controlling application for a connected wearable device (block 1105). For example, controlling application 170 may be downloaded onto user device 210. Controlling application 170 may be used to configure setting for an event widget that enables single-touch activation, on connected wearable device 100, to send a prepared text message to a trusted contact and to receive a pre-recorded audio message from the trusted contact. In this example, the trusted contact for the child may be a grandparent.

Process 1100 may include receiving, via the controlling application, configuration settings for an event widget (block 1110). For example, controlling application 170 may provide a user interface to solicit/collect an event name, a widget icon, an event time, an event location, a trusted contact, and/or a notification message for an event widget. Assume that the child is enrolled in swimming classes at the local community center (e.g., with lat. 40.612441, long. −74.630490). A "swimming" event widget for the child can be associated with the community center location. Another way to associate the activity with the child is via time-based scheduling. If every Saturday, 7 AM-8 AM, the child is engaged in swimming at the local community center, that time range may also be associated with the "swimming" event widget. For other configuration settings the mom may select an icon or picture associated with swimming and may select the grandparent as a trusted contact. If not previously verified, the grandparent's mobile phone number may be used to generate a verification text message. The notification message associated with the "swimming" event widget may also be input by the mom (e.g., "Julie's at swim class."). Using user device 210, the mom may solicit an audio recording (e.g., via phone or live) from the grandparent related to the "swimming" event widget with a message to the child (e.g., "Good luck with swim class today, Julie. I wish I could be there!").

Process 1100 may also include storing the configuration settings associated with the wearable device (block 1115), and downloading the event widget to the connected wearable device (block 1120). For example, controlling application 170 may provide the event widget configuration settings to application server 120 for execution and storage. Application server 120 may then download the configured event widget to connected wearable device 100, such as a "swimming" event widget to the child's connected wearable device 100.

Process 1100 may further include receiving, from the wearable device, a selection signal that the event widget has been selected (block 1125), identifying a widget selection time and a current location for the connected wearable device (block 1130), and comparing the widget selection time and current location for the wearable device against the stored configuration settings (block 1135). For example, the child may press an icon representing the "swimming" event widget. Connected wearable device 100 may provide a selection signal (e.g., selection status 130/widget selection 920) to application server 120 with a widget ID, a current time, and a current location. Application server 120 may cross-reference the information from the selection signal with the stored configuration settings for the "swimming" event widget.

If the widget selection time and current location do not match the stored configuration settings (block 1135—NO MATCH), the sending of the prepared text message to the trusted contact may be blocked (block 1190). For example, if the child is not at swim class when pressing the icon representing the "swimming" event widget, application server 120 may ignore or actively block sending of the notification message by connected wearable device 100.

If the widget selection time and current location match the stored configuration settings (block 1135—MATCH), process 1100 may include authorizing the wearable device to send the prepared text message to the trusted contact (block 1140), receiving, from the trusted contact, an acknowledgement of the prepared text message (block 1145), and sending, to the connected wearable device and in response to the acknowledgement, the pre-recorded audio message (block 1150). For example, application server 120 may provide connected device 100 an authorization message to enable connected device 100 to issue a text with the previously stored notification message (or application server may provide the notification message directly) to third-party device 110. The trusted contact may acknowledge the message, which may cause application server 120 to place an audio call to connected device 100 an play the recorded message from the trusted contact. In the example of the "swimming" event widget, when the child presses the widget while at swimming class, the notification message "Julie's at swim class" may be sent as a text message to the grandparent. The grandparent may reply to acknowledge the text message and, thus, show an active interest in the child's swimming activity. Application server 120 may receive the grandparent's reply text and automatically place a call to the child's connected device 100 to play the pre-recorded message "Good luck with swim class today, Julie. I wish I could be there!"

According to implementations described herein, a user device may include a controlling application for a child's connected wearable device. A network device (e.g., an application server) may receive, via the controlling application, configuration settings for an event widget that enables single-touch activation, on the connected wearable device, to send a prepared text message to a trusted contact and to receive a pre-recorded audio message from the trusted contact. The network device may download the event widget to the connected wearable device and may receive message that the event widget has been selected. The network device may authorize the connected wearable device to send the prepared text message to the trusted contact when the widget selection time and/or current location for the connected wearable device match the stored configuration settings. The network device may receive, from the trusted contact an acknowledgement of the prepared text message, and may send, to the connected wearable device and in response to the acknowledgement, the pre-recorded audio message.

In the preceding specification, various preferred embodiments have been described with reference to the accompanying drawings. Various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 11, the order of the blocks may be modified in other implementations. Further, non-dependent blocks may be performed in parallel.

Different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method performed by an application server device, the method comprising:
    providing, to a user device of a guardian, a controlling application for a connected wearable device of a child;
    receiving, via the controlling application, configuration settings for an event widget that activates the connected wearable device to send a prepared text message to a trusted contact and to receive a pre-recorded audio message from the trusted contact;
    storing the configuration settings associated with the connected wearable device;
    downloading, to the connected wearable device, the event widget;
    receiving, from the connected wearable device, a selection signal that the event widget has been selected;
    identifying, based on the selection signal, a widget selection time and a current location for the connected wearable device;
    comparing the widget selection time or current location for the connected wearable device against the stored configuration settings;
    authorizing the connected wearable device to send the prepared text message to the trusted contact when one or more of the widget selection time or current location matches the stored configuration settings;
    receiving, from the trusted contact, an acknowledgement of the prepared text message; and
    sending, to the connected wearable device and in response to the acknowledgement, the pre-recorded audio message.

2. The method of claim 1, wherein receiving the configuration settings includes:
    receiving, via the controlling application, contact information for a trusted contact of the child;
    receiving, via the controlling application, venue information for an activity of the child; and
    receiving, via the controlling application, the pre-recorded audio message from the trusted contact.

3. The method of claim 2, the contact information including a phone number and a name.

4. The method of claim 2, the venue information including a widget icon, an event time, an event location, a trusted contact, and a notification message associated with the event widget.

5. The method of claim 2, further comprising:
    sending, to a third-party device of the trusted contact, a verification request for the contact information; and
    receiving, from the third-party device, a response verifying the contact information.

6. The method of claim 1, further comprising:
    assigning a unique identifier for the event widget.

7. The method of claim 6, wherein the selection signal includes the unique identifier.

8. The method of claim 1, wherein the prepared text message includes an acknowledgement option to direct an acknowledgement to the application server device.

9. The method of claim 1, wherein sending the prepared text message includes sending a short message service (SMS) message to the trusted contact via the application server device.

10. The method of claim 1, further comprising:
    providing, based on the acknowledgement of the prepared text message, an option to view a video stream from the user device;
    receiving, from the trusted contact in response to the option, a request to view the video stream;
    providing, to the controlling application, the request to view the video stream;
    receiving, from the controlling application, video stream information for the user device; and
    sending, to the trusted contact, a link to access the video stream.

11. The method of claim 1, further comprising:
    sending, by the trusted contact and to the application server device, an acknowledgement of the prepared text message.

12. A system, comprising:
    a connected wearable device including a memory to store an event widget and a processor to execute the event widget;
    a user device including a memory to store a controlling application for the connected wearable device and a processor to execute the controlling application;
    a network device including a memory to store instructions and a processor to execute the instructions to:
        receive, via the controlling application, configuration settings for an event widget that activates the connected wearable device to send a prepared text message to a trusted contact and to receive a pre-recorded audio message from the trusted contact;
        store, in the memory, the configuration settings associated with the connected wearable device;
        download, to the connected wearable device, the event widget;
        receive, from the connected wearable device, a selection signal that the event widget has been selected;
        identify, based on the selection signal, a widget selection time and a current location for the connected wearable device;
        compare the widget selection time or location for the connected wearable device against the stored configuration settings;
        authorize the connected wearable device to send the prepared text message to the trusted contact when one or more of the widget selection time or current location matches the stored configuration settings;
        receive, from the trusted contact, an acknowledgement of the prepared text message; and
        send, to the connected wearable device and in response to the acknowledgement, the pre-recorded audio message.

13. The system of claim 12, the configuration settings including:
    a phone number and a name of a trusted contact; and
    a widget icon, an event time, an event location, and a notification message associated with the event widget.

14. The system of claim 12, wherein the processor of the network device is further to assign a unique identifier for the event widget.

15. The system of claim 12, further comprising:
    provide an audio version of the prepared text message to the trusted contact via an interactive voice response system.

16. The system of claim 12, wherein the processor of the network device is further to:
    forward the prepared text message to the trusted contact as a short message service (SMS) message.

17. The system of claim 12, wherein the processor of the user device is further to:
- send, to a device of the trusted contact, a verification request for the trusted contact; and
- receive, from the device, a response verifying the trusted contact.

18. A non-transitory computer-readable medium storing instructions executable by a computational device to:
- provide, to a user device, a controlling application for a connected wearable device;
- receive, via the controlling application, configuration settings for an event widget that enables single-touch activation, on the connected wearable device, to send a prepared text message to a trusted contact and to receive a pre-recorded audio message from the trusted contact;
- store the configuration settings associated with the connected wearable device;
- download, to the connected wearable device, the event widget;
- receive, from the connected wearable device, a selection signal that the event widget has been selected;
- identify, based on the selection signal, a widget selection time and a current location for the connected wearable device;
- compare the widget selection time or current location for the connected wearable device against the stored configuration settings;
- authorize the connected wearable device to send the prepared text message to the trusted contact when one or more of the widget selection time or current location matches the stored configuration settings;
- send the prepared text message to the trusted contact;
- receive, from the trusted contact, an acknowledgement of the prepared text message; and
- send, to the connected wearable device and in response to the acknowledgement, the pre-recorded audio message.

19. The non-transitory computer-readable medium of claim 18, further comprising instructions to:
- provide, based on the acknowledgement of the prepared text message, an option to view a video stream from the user device;
- receive, from the trusted contact in response to the option, a request to view the video stream;
- provide, to the controlling application, the request to view the video stream;
- receive, from the controlling application, video stream information for the user device; and
- send, to the trusted contact, a link to access the video stream.

20. The non-transitory computer-readable medium of claim 18, further comprising instructions to:
- solicit, via the controlling application, contact information for a trusted contact; and
- solicit, via the controlling application, venue information for an activity.

* * * * *